US012179214B2

(12) United States Patent
Elliott et al.

(10) Patent No.: US 12,179,214 B2
(45) Date of Patent: Dec. 31, 2024

(54) EXTRACTING RARE-EARTH ELEMENTS FROM A GANGUE HEAVY FRACTION

(71) Applicants: Georgia State University Research Foundation, Atlanta, GA (US); Thiele Kaolin Company, Sandersville, GA (US)

(72) Inventors: W. Crawford Elliott, Atlanta, GA (US); Daniel Joseph Gardner, Atlanta, GA (US); Ed Riley, Sandersville, GA (US); Prakash Malla, Sandersville, GA (US)

(73) Assignees: Georgia State University Research Foundation, Atlanta, GA (US); Thiele Kaolin Company, Sandersville, GA (US)

( * ) Notice: Subject to any disclaimer, the term of this patent is extended or adjusted under 35 U.S.C. 154(b) by 1233 days.

(21) Appl. No.: 16/903,871

(22) Filed: Jun. 17, 2020

(65) Prior Publication Data

US 2021/0001350 A1 Jan. 7, 2021

Related U.S. Application Data

(63) Continuation of application No. 16/345,451, filed as application No. PCT/US2017/059320 on Oct. 31, 2017, now Pat. No. 10,688,501.

(60) Provisional application No. 62/415,093, filed on Oct. 31, 2016.

(51) Int. Cl.

| | |
|---|---|
| ***B03B 9/00*** | (2006.01) |
| ***B03B 5/30*** | (2006.01) |
| ***C22B 1/00*** | (2006.01) |
| ***C22B 59/00*** | (2006.01) |

(52) U.S. Cl.

CPC .................. *B03B 9/00* (2013.01); *B03B 5/30* (2013.01); *C22B 1/00* (2013.01); *C22B 59/00* (2013.01)

(58) Field of Classification Search

CPC .... B03B 9/00; B03B 5/30; C22B 1/00; C22B 59/00

USPC .......................................................... 423/21.1

See application file for complete search history.

(56) References Cited

U.S. PATENT DOCUMENTS

| | | | |
|---|---|---|---|
| 5,328,035 | A | 7/1994 | Duyvesteyn et al. |
| 6,468,343 | B1 | 10/2002 | Pruett et al. |
| 2011/0001078 | A1 | 1/2011 | Yildirim et al. |
| 2015/0176105 | A1 | 6/2015 | Davis et al. |
| 2019/0247860 | A1 | 8/2019 | Elliott et al. |

OTHER PUBLICATIONS

Moll, "Baseline Studies of the Clay Minerals Society Source Clays: Geological Origin", Clays and Clay Minerals, vol. 49, No. 5, pp. 374-380.

(Continued)

*Primary Examiner* — Melissa S Swain

(74) *Attorney, Agent, or Firm* — Lee & Hayes, P.C.

(57) ABSTRACT

Described herein are technologies for concentrating rare-earth elements from a heavy fraction of grit in gangue produced in kaolin mining. In some examples, grit is separated as a non-clay fraction of gangue produced in a kaolin mining operation. The grit is separated into a heavy mineral grit sub-fraction and a light mineral grit sub-fraction. Rare-earth elements, particularly heavy rare-earth elements, are thereafter extracted from the heavy mineral grit sub-fraction using various extraction technologies.

16 Claims, 3 Drawing Sheets

(56) References Cited

OTHER PUBLICATIONS

Office Action for U.S. Appl. No. 16/345,451, mailed on Jun. 28, 2019, Elliott, "Extracting Rare-Earth Elements From a Gangue Heavy Fraction", 5 pages.
PCT Search Report and Written Opinion mailed Feb. 2, 2018 for PCT application No. PCT/US17/59320, 8 pages.

FIG. 2
Ti
Ti
Ti
Zr
Zr
Zr
100 µm
EHT = 30.00 kV
WD = 24 mm
Signal A = SE1
BC Heavy
Mag = 500 X

EXTRACTING RARE-EARTH ELEMENTS FROM A GANGUE HEAVY FRACTION

CROSS-REFERENCE TO RELATED APPLICATIONS

This application is a continuation of co-pending U.S. application Ser. No. 16/345,451 filed Apr. 26, 2019, entitled "Extracting Rare Earth Elements From a Gangue Heavy Fraction," which is a U.S. National Phase application of International Application No. PCT/US17/59320 filed Oct. 31, 2017, entitled "Extracting Rare Earth Elements From a Gangue Heavy Fraction," which claims priority to U.S. Provisional Patent Application No. 62/415,093 filed Oct. 31, 2016, entitled "Extracting Rare Earth Elements From a Gangue Heavy Fraction," all of which are incorporated by reference in their entirety as if fully set forth herein.

BACKGROUND

With the explosive growth of various technologies, rare-earth elements are increasingly vital to sustain that growth. A rare-earth element (REE), as defined by IUPAC, is one of a set of seventeen chemical elements in the periodic table, specifically the fifteen lanthanides, as well as scandium and yttrium. Rare-earth elements are cerium (Ce), dysprosium (Dy), erbium (Er), europium (Eu), gadolinium (Gd), holmium (Ho), lanthanum (La), lutetium (Lu), neodymium (Nd), praseodymium (Pr), promethium (Pm), samarium (Sm), scandium (Sc), terbium (Tb), thulium (Tm), ytterbium (Yb) and yttrium (Y). Heavy rare-earth metals are defined as the high atomic number lanthanide rare-earth metals: dysprosium (Dy), erbium (Er), gadolinium (Gd), holmium (Ho), lutetium (Lu), terbium (Tb), thulium (Tm), and ytterbium (Yb).

Rare-earth elements are used to build items such as batteries, permanent magnets, and displays. Rare-earth elements can also be used in various processes such as refining crude oil. An estimated distribution of rare-earth elements by end use is as follows, in decreasing order: catalysts, 60%; metallurgical applications and alloys, 10%; ceramics and glass, 10%; glass polishing, 10%; and other, 10%.

Due to the costs of extracting REEs, and the geographic distribution of known geologic deposits being mined for the rare-earth elements, a large percentage of REEs are provided in one particular region of the world. The estimated value of rare-earth compounds and metals imported by the United States in 2015 was $150 million, a decrease from $191 million imported in 2014. Finding sources of REEs and determining methods of concentrating or extracting those REEs are highly desirable.

It is with respect to these and other considerations that the various configurations described below are presented.

SUMMARY

Technologies are disclosed herein for concentrating rare-earth elements from the gangue separated from the kaolin clay fraction. This gangue is also informally known as grit in the kaolin mining industry. Crude kaolin clay is provided as part of a mining operation for kaolin. The kaolin clay is crushed and blunged in a solution. In some examples, the solution includes a dispersant. In the solution, the crude kaolin clay is separated into a grit fraction (gangue) and a kaolin clay fraction. The kaolin clay fraction is processed further to provide kaolin products. The grit fraction (gangue) retained on a 325 mesh screen (44 microns) is separated into a light grit sub-fraction and a heavy grit sub-fraction. In some examples, heavy rare-earth elements are concentrated in the heavy grit sub-fraction.

These and various other features as well as advantages will be apparent from a reading of the following detailed description and a review of the associated drawings.

DETAILED DESCRIPTION

Figure 1:
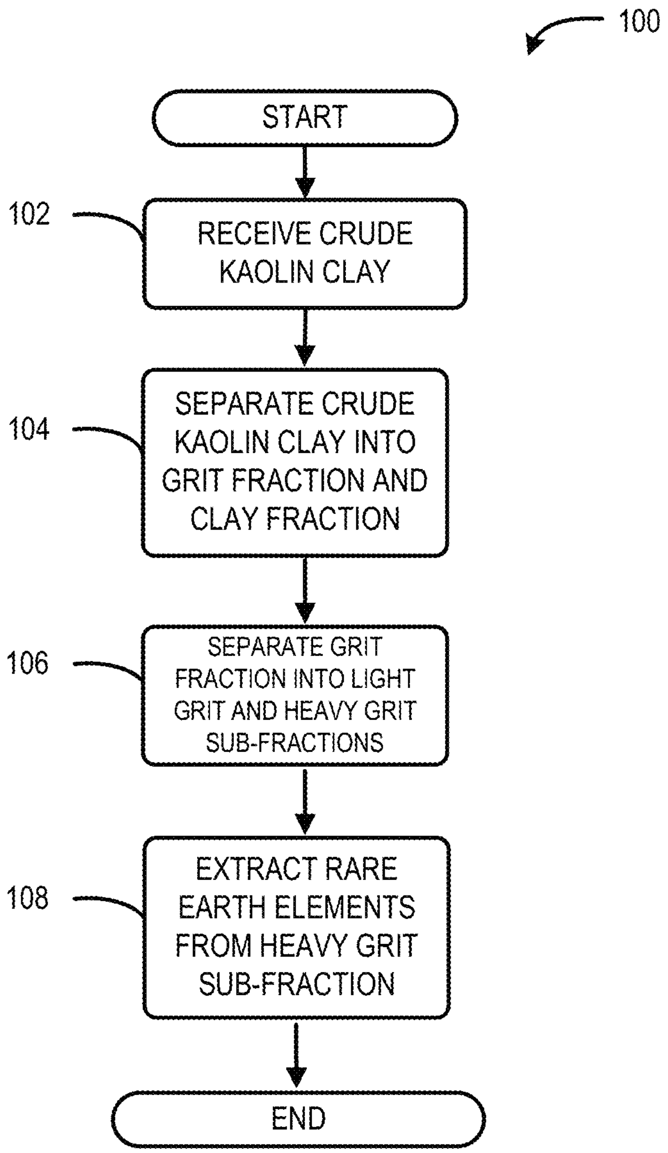
FIG. 1 is an example method for extracting rare-earth elements from gangue produced in kaolin mining.

Technologies are disclosed herein for concentrating rare-earth elements from the gangue produced in kaolin mining. In some examples, the gangue can be produced from processing kaolin ore mined from various kaolin-bearing formations, including the Cretaceous Buffalo Creek Formation and the Eocene Jeffersonville Member of the Huber Formation in Georgia, along with other formations not disclosed herein.

The Buffalo Creek Formation was deposited during the late Cretaceous Period. The kaolins within this formation are relatively soft, coarse-grained (approximately 55-65%<2 μm), and laterally discontinuous. The Tertiary Huber Formation overlays the Buffalo Creek Formation in the Georgia Kaolin District. The Huber Formation is sub-divided into two members, the Paleocene Marion Member and the Eocene Jeffersonville Member. The Eocene Jeffersonville Member of the Huber Formation contains what is often referred to as "hard kaolin." These hard kaolins differ from the Buffalo Creek in hardness, particle size, iron content, and presence of Eocene age trace fossils.

In some examples, the gangue is produced from a kaolin mining operation of the Primary deposits or from a kaolin mining operation of the Secondary (Sedimentary) deposits. Primary deposits, or primary clays, form as residual deposits in soil and remain at the site of formation. Secondary deposits, or secondary clays, are clays that have been transported from their original location by water erosion and deposited in a new sedimentary deposit.

In some examples, crude kaolin clay obtained in a kaolinite mining operation is separated into a grit fraction and a kaolin clay fraction. To separate the crude kaolin clay into the grit fraction (gangue) and the clay fraction (kaolin), crude kaolin clay is crushed and mixed (or blunged) with water and a dispersant, such as sodium (Na)-hexametaphosphate solution. The presently disclosed subject matter is not limited to any particular type of dispersant, as others may be used. For example, other types of dispersants that may be used include, but are not limited to, phosphates such as sodium hexametaphosphate, CALGON, sodium poly phosphates, pyrophopshates, sodium triphosphates, polyacrylates, tetrasodium pyrophosphates (TSPP), carboxylates, sodium silicate, and sodium polyacrylate. In some examples, the crude kaolin clay is crushed and blunged in water at a pH between 6 and 11, preferably 6-8 and in the presence of a dispersant at predetermined solids content in a range of 20-70%, and in some examples, in a range of 30-65%.

Examples of pH modifiers that may be used include, but are not limited to, soda ash ($Na_2CO_3$), sodium hydroxide (NaOH), potassium hydroxide (KOH), and ammonium hydroxide ($NH_4OH$).

The larger grains settle in solution, whereby the finer sized kaolin clay fraction is removed from the mixture to create kaolin products. The resultant material is screened using a mesh, such as a 325 mesh (approximately 44 microns) from the blunged mixture of crude kaolin clay and the blunging solution. The blunging results in grit composed of sand and coarse silt. In some examples, the grit can have particles ranging in size from 0.0039 mm-0.0625 mm (2-62.5 microns) or, in some examples, from 3.9-50 microns. The grit (>325 mesh) can be washed and blunged additional times to remove further clay adhered to the grit (or sand and coarse silt fractions of the grit) from the kaolin clay fraction. A soda ash ($NaCO_3$) and Na-hexametaphosphate solution can be mixed with the remaining blunged sand and coarse silt fractions. The mixture is thereafter sieved and washed with deionized water. The washed material on the screen is then dried to produce a grit fraction.

The grit fraction is fractionated into a light mineral grit sub-fraction and a heavy mineral grit sub-fraction. In some examples, a heavy liquid solution in a separatory funnel is used. As used herein, a "heavy liquid solution" is a liquid having a defined density to cause the fractionation of the grit fraction into a light mineral grit sub-fraction and a heavy mineral grit sub-fraction. In some examples, centrifugal separation methods can be used as well. The heavy liquid/grit fraction mixture settles by density into the light mineral grit sub-fraction and the heavy mineral grit sub-fraction. In some examples, depending on the heavy liquid solution used, mineral grains with densities greater than 2.95 Kg/L settle to the bottom of the funnel, while mineral grains with densities less than 2.95 Kg/L floated to the top of this mixture in the separatory funnel. The collected heavy mineral grit sub-fraction is drained first from the separatory funnel. The heavy mineral grit sub-fraction is thereafter washed with deionized water.

This mixture is covered and left overnight to allow mineral grains with densities greater than 2.95 Kg/L to settle. After settling overnight, the dense grains which settled at the bottom of the separatory funnel are drained into a funnel filter with the first collected heavy mineral grit sub-fraction. The filter is then covered and given time to allow for any excess density medium (for example, Lithium metatungstate) to drain out of the collected dense grains. After the drainage of any excess Lithium metatungstate, the funnel containing the dense grains is rinsed several times using deionized water, resulting in a heavy mineral grit sub-fraction with rare-earth elements. Rare-earth elements can thereafter be extracted using various metallurgical technologies.

Previous methods of extracting REEs from natural sources, including clay or clay extract materials, have focused on the extraction of light rare-earth elements (LREE), including lanthanum (La), cerium (Ce), praseodymium (Pr), neodymium (Nd), promethium (Pm), samarium (Sm), europium (Eu), and gadolinium (Gd) primarily from fine silt material. However, using various examples of the presently disclosed subject matter, enrichment of REE, and particularly of heavy rare-earth elements (including dysprosium (Dy), erbium (Er), gadolinium (Gd), holmium (Ho), lutetium (Lu), terbium (Tb), thulium (Tm), and ytterbium (Yb)), is possible from a portion of a clay-processing stream (grit or gangue) that is typically discarded according to prior art clay processing methods. That specific portion of gangue, when using various examples of the presently disclosed subject matter, which can be useful in REE concentration (particularly heavy REE concentration), is the heavy sub-fraction of the gangue material which is described herein with reference to its method of separation from the desired clay material. Utilization of the gangue "waste" product, and particularly a heavy sub-fraction of same as described herein, in an REE-concentration method produces unexpected results over prior art REE-extraction methods in which the gangue material is routinely disposed of as waste product.

FIG. 1 is a flow diagram showing one illustrative method 100 for concentrating rare-earth elements from gangue produced in kaolin mining. It should be understood that the chemical and mechanical processes described herein are exemplary only, as other chemical and mechanical processes may be used and are considered to be within the scope of various examples of the presently disclosed subject matter.

Gangue generally refers to commercially worthless material that surrounds, or is closely mixed with, a wanted mineral in an ore deposit. In some of the examples provided herein, the gangue was produced from mining operations on the Buffalo Creek Formation and the Eocene Jeffersonville member of the Huber Formation, however, the technologies disclosed herein can be used to concentrate rare-earth elements from other kaolin bearing formations.

In FIG. 1, the method 100 begins at operation 102, where crude (or raw) kaolin clay is received from a mining operation. The crude kaolin clay used in various examples of the subject matter disclosed herein can be found in various locations, including, but not limited to, secondary in origin (sedimentary) such as in Georgia (Buffalo Creek Formation or Jeffersonville Member of the Huber Formation), and Brazil. The crude kaolin clay used in various examples of the subject matter disclosed herein can be found in various locations, including, but not limited to, primary in origin such as in UK (Cornwall), Germany, Ukraine, or China.

The gangue can be received from the mining of kaolin. As noted above, "gangue" refers to commercially worthless material that surrounds, or is closely mixed with, a wanted mineral such as kaolin in an ore deposit. Having little use, the gangue is typically discarded by redepositing the gangue into the area of mining or by some other disposal means. The gangue can be received at a facility separate from a main kaolin mining facility or may be part of the kaolin mining operation. The presently disclosed subject matter is not limited to any particular manner in which the gangue is received into the rare-earth element extraction process.

The method 100 continues to operation 104, where the crude kaolin clay is separated into grit composed of sand and coarse silt having a size of approximately or greater than 44 microns (using a 325 mesh) and a clay fraction that comprises the mined, crude, kaolin clay. In some examples, the gangue is separated from the crude kaolin by blunging followed by de-gritting (e.g. settling). In some examples, gangue is crushed (manually disaggregated). The crushed gangue is mixed with a water/Na-hexametaphosphate solution, placed in a blender, such as a Waring Blender, and blunged. This blunging process helps to disperse the clay from the grit. The grit is allowed to settle and is separated from the clay by pouring off the clay solution, resulting in a grit fraction. Various portions of operation 104 can be repeated to further separate the grit from the clay fraction. In some examples, the clay fraction can be further processed as kaolin clay.

The grit fraction that was separated from the clay fraction is screened. In some examples, the grit is screened using with a 325 mesh sieve (>44 micron) to collect the sand and coarse silt fraction from the finer-sized kaolin clay fraction. Various other sizes of mesh sieves can be used. However, in some examples, a mesh sieve of the 44 micron size can be useful or convenient for isolating sand and the coarse silt. In some examples, the fraction less than 325 mesh Tyler Standard Sieve Series (44 micron) is discarded, resulting in grit composed of sand and coarse silt sized fractions. The grit fraction, composed of sand and coarse silt fractions which remain, is washed and, in some examples, is subjected to a second blunging process to remove any adhered kaolin clay. A soda ash ($NaCO_3$)/Na-hexametaphosphate solution is mixed in the dispersal solution for a second blunging. This mixture is then sieved and washed. The washed material is then oven dried, in some examples at 50° C.

An example of operations 102 and 104 are as follows. Crude kaolin clay (or kaolin ore) is collected. The crude kaolin clay is crushed and mixed with water and CALGON solution. 5 #/ton of CALGON solution is added until the mixture is approximately 0.25 wt. % CALGON (on dry chemical weight/dry clay wt. basis). Other types of dispersants that may be used include, but are not limited to, phosphates (sodium hexametaphosphate—sodium poly phosphates, pyrophopshates, sodium triphosphates), polyacrylates, carboxylates, sodium silicate, tetrasodium pyrophosphates (TSPP), sodium polyacrylate, and sodium hexametaphosphate.

The first blunging operating is performed in a large industrial blender. The mixture is then screened through a 325 mesh (44 micron) sieve. This blunging process can be repeated as necessary to isolate the coarse silt and sand fraction from the crude kaolin clay. The material which does not pass through the sieve is collected for a second blunging to remove adhered clay [as was found in the Jeffersonville Member of the Huber Formation]. The second blunging is done with CALGON and soda ash solution. The same concentration of CALGON is used for the second blunging (0.25 wt % or 5 #/ton). 1 #/ton (0.05 wt %, on dry chemical weight/dry clay wt. basis) soda ash is added to the mixture for the second blunging. A Waring Blender is used in the second blunging. The mixture is passed through a 325 mesh sieve. The material which does not pass through the sieve is collected. The >44 micron material is dried at 50 degrees C. for approximately an hour until dry.

The method 100 continues to operation 106, where the grit fraction is separated into a light mineral grit sub-fraction and a heavy mineral grit sub-fraction using a heavy or dense liquid medium. In some examples, lithium metatungstate ($\rho$=2.95 Kg/L) is used. However, the presently disclosed subject matter is not limited to the use of lithium metatungstate. In some examples, other heavy liquids or heavy mediums (such as a magnetite-water slurry) can be used. Some examples of other heavy liquids include, but are not limited to, bromoform, tetrabromoethane (TBE), sodium polytungstate, and lithium metatungstate (LST) Heavy Liquid. In some examples, the grit fraction is mixed with the lithium metatungstate (LMT) in a separatory funnel. The mixture is allowed to separate, allowing higher density solids (the heavy mineral grit sub-fraction) to settle at the bottom and lower density solids (the light mineral grit sub-fraction) float to the top. The heavy mineral grit sub-fraction is filtered and washed to remove remaining heavy liquid solution. In some examples, various rare-earth elements are in the heavy mineral grit sub-fraction.

The method 100 continues to operation 108, where the rare-earth elements are concentrated and/or extracted in the heavy mineral grit sub-fraction of the grit fraction. The rare-earth elements may be extracted using various technologies, including thermal treatment of the heavy mineral grit sub-fraction in acidic or caustic reagents. In some examples, acid baking may be used whereby the heavy mineral grit sub-fraction is mixed with concentrated sulfuric acid and baked at temperatures between 200° C. and 400° C. for several hours. The resulting cake is leached with water to dissolve rare-earth elements as sulfates. Other methods such as decomposition in hydrochloric acid may be used depending on the particular rare-earth elements contained within the heavy mineral grit sub-fraction.

The presently disclosed subject matter can result in the concentration of various rare-earth elements. Additional processes may be used to extract the rare-earth elements from the heavy mineral grit sub-fraction. For example, a process using alkali carbonate leaching, rare-earth element precipitation, and sulfuric acid leaching of the rare-earth element precipitate may be used.

Further, the rare-earth elements may be present in the heavy mineral grit sub-fraction in various forms. For example, rare-earth elements may be ion-sorbed onto minerals in the heavy mineral grit sub-fraction. The presently disclosed subject matter is not limited to any particular manner in which the rare-earth elements are present in the heavy mineral grit sub-fraction.

The method 100 may thereafter end.

Sample Analysis

Scanning electron microscopy (SEM) examinations including semi quantitative elemental analyses of major and trace elements using a Rontec™ detector were performed on the heavy mineral grit sub-fraction and a light mineral grit sub-fraction. These separations yielded four samples which will be referred to throughout this study: BC light, BC heavy, JV light, and JV heavy, where "BC" refers to Buffalo Creek and "JV" refers to Jeffersonville member.

Figure 2:
FIG. 2 is a scanning electron microscope image of an example of heavy mineral grit sub-fraction of grit separated in kaolin mining in the Buffalo Creek Formation.

Observations varied between the examinations performed on the Buffalo Creek and Jeffersonville samples. Eleven mineral grains of the Buffalo Creek heavy mineral separate were chemically analyzed during the SEM examinations. Among the eleven grains, six showed predominant concentrations of titanium, four exhibited high concentrations of zirconium, and one showed high concentrations of iron and magnesium. Zirconium and titanium bearing minerals within the Buffalo Creek heavy separate are shown in the scanning electron image in FIG. 2. The grains are well-sorted by size and do not show evidence of extensive physical weathering due to transport. The lack of quartz and kaolinite in the heavy separate suggests that the dense liquid separation process successfully separated the relatively heavy minerals from the >44 micron material. Minerals found in the heavy mineral grit sub-fraction include: zircon, rutile, and anatase. Minerals found in the light mineral grit sub-fraction include: quartz, mica, feldspar, and kaolinite.

Figure 3:
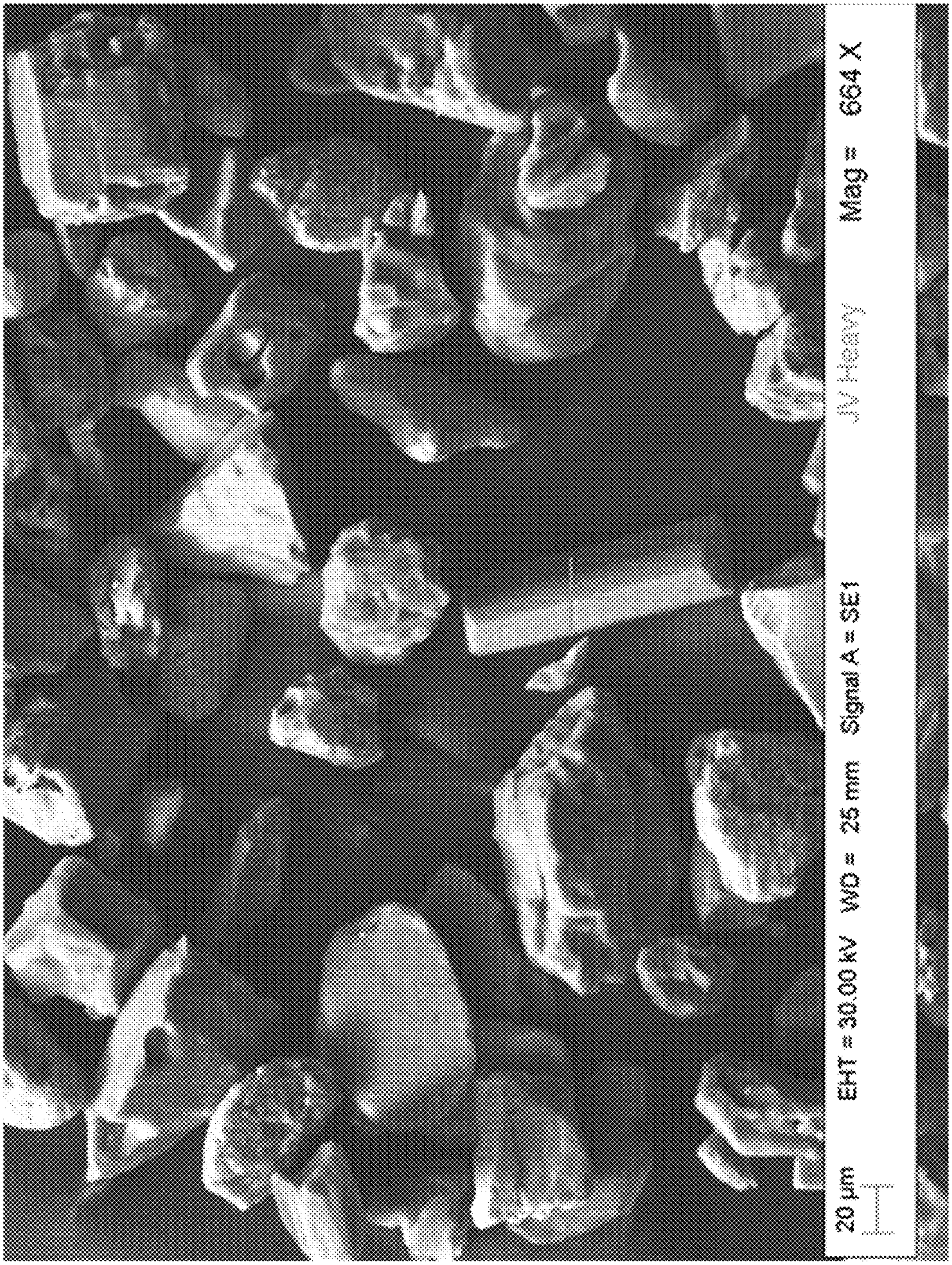
FIG. 3 is a scanning electron microscope image of an example of the heavy mineral grit sub-fraction of grit separated in kaolin mining in the Jeffersonville Member of the Huber Formation.

Ten mineral grains of the Jeffersonville Member separate were chemically analyzed during the SEM examinations. Among the ten grains, six grains showed predominant concentrations of iron and magnesium, three grains showed high concentrations of zirconium, and one grain showed a high concentration of titanium. Similar to the Buffalo Creek heavy separates, only a few grains of quartz and kaolinite grains were seen in the heavy separate. Unlike the Buffalo Creek heavy separates, however, grains of the Jeffersonville separate show unique signs of physical weathering, as shown in the scanning electron image in FIG. 3. During the examinations of the light mineral separates, the major difference observed was the elemental and mineral compositions. While the Buffalo Creek light separate contained mostly kaolinite, the Jeffersonville light separate was predominantly composed of quartz.

Table 1 provides concentrations of rare-earth elements in the samples extracted.

TABLE 1

Concentrations of the Rare Earth Elements (mg/kg)

| Element | BC Grit | JV Grit | BC Heavy | JV Heavy | BC Light | JV Light | UCC |
|---|---|---|---|---|---|---|---|
| La | 23.2 | 2.9 | 298 | 178 | 1.8 | 1.3 | 31 |
| Ce | 48.7 | 5.2 | 612 | 312 | 3.8 | 2.5 | 68 |
| Pr | 5.72 | 0.61 | 72.5 | 37.8 | 0.44 | 0.27 | 7.1 |
| Nd | 22.6 | 2.3 | 274 | 133 | 1.8 | 0.9 | 27 |
| Sm | 6.6 | 0.5 | 75.7 | 30.2 | 0.6 | 0.2 | 4.7 |
| Eu | 0.8 | 0.08 | 7.64 | 5.32 | 0.11 | 0.05 | 1 |
| Gd | 12.9 | 1.3 | 142 | 43.7 | 1.2 | 0.2 | 4 |
| Tb | 3.5 | 0.2 | 35.4 | 10 | 0.3 | 0.1 | 0.7 |
| Dy | 30.1 | 1.5 | 308 | 81.8 | 2.8 | 0.3 | 3.9 |
| Ho | 7.6 | 0.3 | 76.7 | 20.1 | 0.7 | 0.1 | 0.83 |
| Er | 25.7 | 1 | 245 | 65.6 | 2.2 | 0.2 | 2.3 |
| Tm | 4.12 | 0.16 | 40.7 | 11.3 | 0.37 | 0.05 | 0.3 |
| Yb | 28.4 | 1.1 | 274 | 81.5 | 2.5 | 0.3 | 2 |
| Lu | 4.35 | 0.16 | 43 | 13.4 | 0.38 | 0.04 | 0.31 |
| Sc | 87 | 1 | 333 | 68 | 57 | 8 | 14 |
| Y | 273 | 7 | 2175 | 555 | 21 | 2 | 21 |
| Total | 584.29 | 25.31 | 5012.64 | 1646.72 | 97 | 16.51 | 188.14 |

TABLE 2

Concentrations of Rare-earth Elements relative to Upper Continental Crust.

| Element | BC Grit | JV Grit | BC Heavy | JV Heavy | BC Light | JV Light |
|---|---|---|---|---|---|---|
| La | 0.75 | 0.09 | 9.61 | 5.74 | 0.06 | 0.04 |
| Ce | 0.72 | 0.08 | 9.00 | 4.59 | 0.06 | 0.04 |
| Pr | 0.81 | 0.09 | 10.21 | 5.32 | 0.06 | 0.04 |
| Nd | 0.84 | 0.09 | 10.15 | 4.93 | 0.07 | 0.03 |
| Sm | 1.40 | 0.11 | 16.11 | 6.43 | 0.13 | 0.04 |
| Eu | 0.80 | 0.08 | 7.64 | 5.32 | 0.11 | 0.05 |
| Gd | 3.23 | 0.33 | 35.50 | 10.93 | 0.30 | 0.05 |
| Tb | 5.00 | 0.29 | 50.57 | 14.29 | 0.43 | 0.14 |
| Dy | 7.72 | 0.38 | 78.97 | 20.97 | 0.72 | 0.08 |
| Ho | 9.16 | 0.36 | 92.41 | 24.22 | 0.84 | 0.12 |
| Er | 11.17 | 0.43 | 106.52 | 28.52 | 0.96 | 0.09 |
| Tm | 13.73 | 0.53 | 135.67 | 37.67 | 1.23 | 0.17 |
| Yb | 14.20 | 0.55 | 137.00 | 40.75 | 1.25 | 0.15 |
| Lu | 14.03 | 0.52 | 138.71 | 43.23 | 1.23 | 0.13 |
| Sc | 6.21 | 0.07 | 23.79 | 4.86 | 4.07 | 0.57 |
| Y | 13.00 | 0.33 | 103.57 | 26.43 | 1.00 | 0.10 |

Table 1 provides the concentration of Rare-earth metals by chemical analyses. Table 2 provides the concentrations of Rare-earth elements of the various fractions and bulk rock samples normalized to their known and accepted concentrations in Upper Continental Crust. In Table 1, the sum of REE of the heavy mineral grit sub-fractions of BC and JV are much greater than sum of the REE in the chemical analyses of the grit themselves. In Table 2, the Heavy Rare-earth elements in the heavy mineral grit sub-fraction of BC are enriched 79-138 times relative to their concentrations in Upper Continental Crust. The heavy rare-earth elements in the heavy mineral grit sub-fraction of JV are enriched 21-43 times relative to Upper Continental Crust.

Table 3 illustrates an approximation of amounts of rare-earth elements for a given volume (500 $m^3$) of Buffalo Creek (BC) and Jeffersonville Member (JV) based on the samples extracted:

TABLE 3

Concentration of REE in 500 $m^3$ of Kaolin

| Sample | % Grit | Mass of Grit (g) | ppm REE | REE in Grit (g) |
|---|---|---|---|---|
| BC | 9 | 64,350,000 | 224.29 | 14,433.06 |
| JV | 9.6 | 81,600,000 | 17.31 | 1,412.50 |

Based on the foregoing, it should be appreciated that technologies have been described herein for concentrating rare-earth elements by producing a heavy mineral grit sub-fraction of gangue derived from mining of kaolin clay (or ore). It should also be appreciated that the heavy rare-earth elements are more concentrated in the heavy mineral sub-fractions. The various configurations described above are provided by way of illustration only and should not be construed to limit the disclosed subject matter. Those skilled in the art will readily recognize various modifications and changes that can be made to the presently disclosed subject matter without following the example configurations and applications illustrated and described herein, and without departing from the true spirit and scope of the invention, which is set forth in the following claims.

The invention claimed is:

1. A method of concentrating a rare-earth element, the method comprising:
- receiving crude clay from a mining operation of a kaolin-bearing formation;
- separating the crude clay into a grit and a kaolin clay fraction, wherein the grit is gangue from the mining operation;
- separating the grit fraction into a light mineral grit sub-fraction and a heavy mineral grit sub-fraction; and
- concentrating the rare-earth element from the heavy mineral grit sub-fraction.

2. The method of claim 1, wherein separating the crude clay into the grit fraction and the kaolin clay fraction comprises:
- crushing the crude clay and mixing the crushed, crude clay with water and a dispersant; and
- screening the grit using a 325 mesh sieve (44 microns) to produce the grit fraction, the grit fraction comprising a coarse silt fraction and a sand fraction.

3. The method of claim 2, wherein the dispersant comprises sodium hexametaphosphate solution.

4. The method of claim 1, wherein the silt fraction comprises particles ranging in size from 2 microns to 62.5 microns or from 3.9 microns to 50 microns.

5. The method of claim 1, wherein separating the grit fraction into the light mineral grit sub-fraction and the heavy mineral grit sub-fraction comprises placing the grit fraction into a heavy liquid solution having a defined density to cause a fractionation of the grit concentration into the light mineral grit sub-fraction and the heavy mineral grit sub-fraction, wherein the rare-earth element is present in the heavy mineral grit sub-fraction.

6. The method of claim 5, wherein mineral grains with densities greater than 2.95 Kg/L settle to the bottom of the heavy liquid solution and mineral grains with densities less than 2.95 Kg/L floated to the top of the heavy liquid solution.

7. The method of claim 5, wherein the heavy liquid comprises lithium metatungstate (LMT).

8. The method of claim 5, wherein the heavy liquid comprises at least one of bromoform, tetrabromoethane (TBE), sodium polytungstate, or LMT Heavy Liquid.

9. The method of claim 1, wherein concentrating the rare-earth element from the heavy mineral grit sub-fraction comprises performing a thermal treatment of the heavy mineral grit sub-fraction or acid baking of the heavy mineral grit sub-fraction.

10. The method of claim 9, wherein the rare-earth element comprises cerium (Ce), dysprosium (Dy), erbium (Er), europium (Eu), gadolinium (Gd), holmium (Ho), lanthanum (La), lutetium (Lu), neodymium (Nd), praseodymium (Pr), promethium (Pm), samarium (Sm), scandium (Sc), terbium (Tb), thulium (Tm), ytterbium (Yb) or yttrium (Y).

11. The method of claim 1, wherein the gangue is produced from a mining operation in the Buffalo Creek Formation.

12. The method of claim 1, wherein the gangue is produced from a mining operation in the Jeffersonville Member of the Huber Formation.

13. The method of claim 1, wherein the gangue is produced from a mining operation of the Primary deposits.

14. The method of claim 1, wherein the gangue is produced from a mining operation of the Secondary deposits.

15. The method of claim 1, wherein the gangue is produced from a mining operation of the Sedimentary deposits.

16. The method of claim 1, wherein separating the grit fraction into the light mineral grit sub-fraction and the heavy mineral grit sub-fraction is performed using a centrifugal separation.

* * * * *